Aug. 14, 1934.  J. T. HELLMANN  1,970,454
COOKING UTENSIL
Filed Dec. 5, 1933
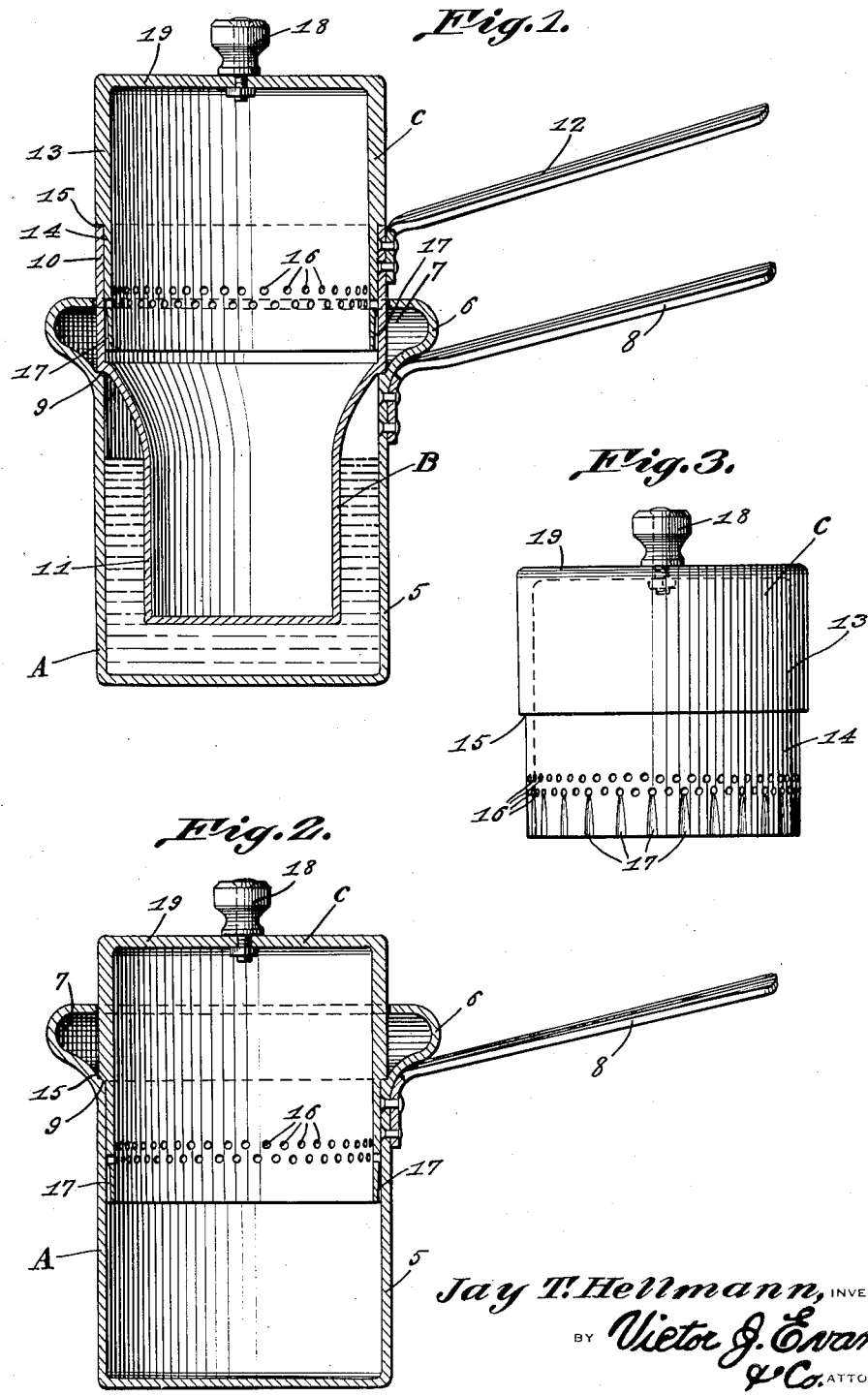
Jay T. Hellmann, INVENTOR
BY Victor J. Evans & Co. ATTORNEY Patented Aug. 14, 1934

1,970,454

UNITED STATES PATENT OFFICE 1,970,454

COOKING UTENSIL

Jay T. Hellmann, Boston, Mass.

Application December 5, 1933, Serial No. 701,065

2 Claims. (Cl. 53—1)

The invention relates to a cooking utensil or vessel and more especially to a combination double boiler and steamer.

The primary object of the invention is the provision of a utensil or vessel of this character, wherein the same is made of three parts including the outer receptacle, the inner receptacle and the lid, the latter being adapted for removable fitting with either of said receptacles, and the inner receptacle being removable from the outer receptacle so that when the inner receptacle is removed and the lid applied to the outer receptacle the utensil can be used for cooking next to the flame of a stove, while the inner receptacle when placed within the outer receptacle affords a double boiler.

Another object of the invention is the provision of a utensil or vessel of this character, wherein the lid is of novel construction so that in the use of the utensil either with or without the inner receptacle there will be no boiling over of water which is damaging to a cooking stove either of the gas or electric type or even of the coal burning type.

A further object of the invention is the provision of a utensil or vessel of this character, wherein the inner receptacle, when having the lid applied thereto and within the outer receptacle, constitutes a condenser to permit the escapement of boiling liquid or steam therefrom without the possibility of the loss of the material being cooked, that is to say, the escapement of the material from the inner receptacle when freeing the fluid therefrom.

A still further object of the invention is the provision of a utensil or vessel of this character, wherein in the use of the outer receptacle and the lid, foodstuff and water may be placed in the outer receptacle and during the cooking operation, when excessive heat is present, the water will boil high within the outer receptacle by the heat pressure and when sufficiently raised it will lift the lid so that the excessively heated water will flow from the lid back into the outer receptacle without any possibility of the boiling over of the utensil or vessel and this lid, in its action, serves as an automatic air-tight seal for the cooking chamber of the utensil or vessel.

A still further object of the invention is the provision of a utensil or vessel of this character which is extremely simple in construction, thoroughly reliable and efficient in its purposes, handy for use, durable, portable, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claims hereunto appended.

In the accompanying drawing:

Figure 1 is a vertical sectional view through a utensil or vessel constructed in accordance with the invention and disclosing the complete assembly of this part.

Figure 2 is a view similar to Figure 1 showing the inner receptacle removed for the use of the utensil or vessel directly against the flame of a cooking stove.

Figure 3 is a side elevation of the lid removed.

Similar reference characters indicate corresponding parts throughout the several views in the drawing.

Referring to the drawing in detail, the cooking utensil or vessel comprises an outer receptacle A, an inner receptacle B and a lid C, respectively. This outer receptacle A comprises a cylindrical body 5 having an upper open end, this end being outwardly bulged to provide a flared rim 6 to the open end and to effect an escapement channel or groove 7 internally circumferentially with respect to the open end of said body 5. The body 5 carries a handle 8. Internally of the body 5, immediately beneath the channel or groove 7, is an annular seat or shoulder 9 for a purpose presently described.

The inner receptacle B has its body 10, at the outer or upper end portion thereof, of a like diameter to the diameter of the outer receptacle A and is formed with the lower contracted portion 11 in which is adapted to be received the substance to be cooked when the utensil or vessel is used as a double boiler. The body 10 of the inner receptacle B, when fitted within the outer receptacle A, rests upon the shoulder or seat 9 so that the contracted lower portion 11 depends within said outer receptacle, as is clearly shown in Figure 1 of the drawing. The inner receptacle B, at its body 10, carries a handle 12 alike to the handle 8.

Engageable with either the outer or inner receptacle A or B is the lid C which is constituted by an inverted substantially cup-shaped body 13 having the reduced circular portion 14 providing an external shoulder 15 and this reduced portion 14 has formed therein spaced circular rows of holes or openings 16, the lowermost row of holes or openings 16 being in communication with externally formed escapement passages or channels 17 in said reduced portion 14, these channels or passages opening through the free edge of the body of said lid C. On the fitting of the lid C to the outer receptacle A when the inner receptacle B is free therefrom, the shoulder 15 of said lid contacts with the seat 9 in the outer receptacle A and the reduced portion 14 snugly telescopes into said outer receptacle. When the lid C is applied to the outer receptacle A with the inner receptacle B removed therefrom the utensil or vessel is usable directly with the flame of a cooking stove and this lid will prevent steam within the cooking chamber from escaping into a room and also avoids the boiling over of the water within said outer receptacle. In other words, the lid will function as an automatic condenser because when the water, by excessive heat, boils high within the receptacle A the lid will automatically rest under the heat pressure so that the rows of openings 16 will permit the escape therethrough of the boiling water and steam into the channel or groove 7 and thence back into the receptacle A. By this action the escape of steam or boiling over of the water from the receptacle A is prevented.

When the lid C is placed upon the inner receptacle B and the latter placed within the outer receptacle A for the use of the cooking utensil or vessel as a double boiler, the excessive steam within the inner receptacle or the boiling water when rising high therein will be free to escape through the lower row of openings or holes 16 back into the inner receptacle B and this lid in its fitting with the inner receptacle avoids the possibility of the boiling over of the water within the utensil and constitutes a seal for said inner receptacle in the use thereof with the outer receptacle as a double boiler.

The lid C has a handhold or finger-engaging knob 18 mounted at the center of the closed top 19 thereof.

The circumferential chamber 7 takes care of the condensation of steam that escapes from the lower part of the outer receptacle when used as either a single or double boiler and, additionally, by such formation of chamber it is necessary for perpendicular movements of either the inner receptacle or the lid when either is applied to the outer receptacle. When the utensil or vessel is used as a single boiler the lid prevents escapement of food solids from the lower part of the outer receptacle into the circumferential chamber. In either a single or double boiler adjustment of the utensil the escapement of steam is largely from the outer receptacle coming from the liquid next to the flame. Therefore, the condensing feature of the circumferential chamber is simple and complete. It is formed by the oval convex coming inwardly of the extreme upper part of the chamber until the same contacts with the sides of either the inner receptacle or the lid when applied to the outer receptacle, and the upper part of the circumferential chamber remains slidingly closed with its upper metallic part and cooled air and water being within will condense escaping steam and cause it to return later to the lower part of the outer receptacle.

Also the closing-in formation of the upper part of the circumferential chamber until the same contacts the sides of either the inner receptacle or of the lid when applied to the outer receptacle forms a sliding guide to keep either the inner receptacle or the lid in proper position during perpendicular movements in the cooking process. The circular row of small holes in the lower portion of the lid also serves to prevent the escapement of food solids from the lower part of the outer receptacle into the circumferential chamber during the cooking process.

What is claimed is:

1. A utensil of the character described comprising an outer receptacle having an open upper end and an internal channel next thereto, an inner receptacle seated within the outer receptacle and having a contracted lower portion, and a lid removably fitted on said inner receptacle and having a reduced perforated portion snugly telescopically fitted in said inner receptacle, the reduced lower portion of said lid having escapement passages opening through the free edge thereof and communicating with certain of said perforations therein.

2. A utensil of the character described comprising an outer receptacle having an open upper end and an internal channel next thereto, an inner receptacle seated within the outer receptacle and having a contracted lower portion, and a lid removably fitted on said inner receptacle and having a reduced perforated portion snugly telescopically fitted in said inner receptacle, the reduced lower portion of said lid having escapement passages opening through the free edge thereof and communicating with certain of said perforations therein, the said lid being removably telescopically fitted in the outer receptacle when the inner receptacle is removed therefrom.

JAY T. HELLMANN.